United States Patent
Sanchez Patino et al.

(10) Patent No.: US 10,418,746 B2
(45) Date of Patent: Sep. 17, 2019

(54) CHARGE PORT ASSEMBLY AND MOLDING METHOD

(71) Applicant: FORD GLOBAL TECHNOLOGIES, LLC, Dearborn, MI (US)

(72) Inventors: Francisco Damian Sanchez Patino, Estado de Mexico (MX); Victor Ariel Perez Barrera, Mexico City (MX); Mario Contreras sosa, Estado de Mexico (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 68 days.

(21) Appl. No.: 15/358,319

(22) Filed: Nov. 22, 2016

(65) Prior Publication Data
US 2018/0145442 A1 May 24, 2018

(51) Int. Cl.
| | |
|---|---|
| *B60K 15/04* | (2006.01) |
| *H01R 13/52* | (2006.01) |
| *B29C 45/16* | (2006.01) |
| *B60K 1/00* | (2006.01) |
| *B60L 50/50* | (2019.01) |
| *B60L 53/16* | (2019.01) |
| *B29L 31/30* | (2006.01) |
| *B60K 15/03* | (2006.01) |
| *B60K 15/05* | (2006.01) |

(52) U.S. Cl.
CPC ..... *H01R 13/5219* (2013.01); *B29C 45/1671* (2013.01); *B60K 1/00* (2013.01); *B60K 15/04* (2013.01); *B60L 50/50* (2019.02); *B60L 53/16* (2019.02); *B29C 2045/1673* (2013.01); *B29L 2031/30* (2013.01); *B60K 2015/03493* (2013.01); *B60K 2015/047* (2013.01); *B60K 2015/053* (2013.01); *H01R 2201/26* (2013.01)

(58) Field of Classification Search
CPC .. H01R 12/716; H01R 13/44; H01R 13/5202; H01R 13/53; H01R 13/62; H01R 13/62938; H01R 13/62955; H01R 2103/00; H01R 2201/20; H01R 2201/26; H01R 24/28; H01R 24/76
See application file for complete search history.

(56) References Cited

U.S. PATENT DOCUMENTS

| | | | | |
|---|---|---|---|---|
| 4,822,294 | A * | 4/1989 | McCleam | H01R 13/5221 439/274 |
| 8,720,968 | B2 | 5/2014 | Zalan et al. | |
| 8,905,768 | B2 * | 12/2014 | Hara | H01R 13/447 439/136 |
| 8,951,060 | B2 | 2/2015 | Meyer-Ebeling | |
| 9,559,475 | B1 * | 1/2017 | Shaeffer | H01R 31/06 |
| 2002/0016086 | A1 * | 2/2002 | Kinsey | H01R 27/02 439/34 |

(Continued)

*Primary Examiner* — Truc T Nguyen
(74) *Attorney, Agent, or Firm* — Carlson, Gaskey & Olds

(57) ABSTRACT

A charge port assembly for an electrified vehicle includes a housing having an opening and a first interchangeable seal removably received within the opening. A molding method for molding a charge port assembly includes injecting a first shot of material into a mold cavity to form a housing of the charge port assembly, positioning an insert within the mold cavity, and injecting a second shot of material into the mold cavity to form an interchangeable seal within the housing.

8 Claims, 5 Drawing Sheets

(56) References Cited

U.S. PATENT DOCUMENTS

| | | | |
|---|---|---|---|
| 2005/0239308 A1* | 10/2005 | Cummings | H01R 13/5213 439/166 |
| 2009/0088010 A1* | 4/2009 | Smith | H01R 13/5205 439/136 |
| 2010/0108348 A1* | 5/2010 | Sticker | H01R 13/447 174/67 |
| 2012/0312577 A1* | 12/2012 | Carbone | H02G 3/088 174/66 |
| 2013/0021162 A1* | 1/2013 | DeBoer | B60L 11/1816 340/635 |
| 2014/0167696 A1* | 6/2014 | Kahara | B60L 11/1818 320/109 |
| 2014/0178518 A1 | 6/2014 | Cook | |
| 2015/0042275 A1 | 2/2015 | Schoener et al. | |
| 2015/0274010 A1 | 10/2015 | Roth et al. | |
| 2016/0372859 A1* | 12/2016 | Osaki | H01R 13/5202 |

* cited by examiner

CHARGE PORT ASSEMBLY AND MOLDING METHOD

TECHNICAL FIELD

This disclosure relates to a charge port assembly for an electrified vehicle and a molding method for manufacturing the charge port assembly. An exemplary charge port assembly is formed in a two-shot molding process and includes a housing and an interchangeable seal removably received within the housing.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A charging system can be used to connect some electrified vehicles to an external power source, such as a wall outlet or a charging station, to charge the electrified vehicle battery pack. Plug-in hybrid electric vehicles, for example, typically include a charge port assembly that provides a port for plugging an inlet charge coupler into the charge port assembly. The charge port assembly must be sized and shaped to accommodate the specific inlet charge coupler (e.g., Type 1, Type 2, etc.) that is appropriate for the market where the electrified vehicle is to be sold and operated. Therefore, unique tooling sets are required for manufacturing charge port assemblies for electrified vehicles sold and operated in different global regions (e.g., North America, Europe, Asia, etc.).

SUMMARY

A charge port assembly for an electrified vehicle according to an exemplary aspect of the present disclosure includes, among other things, a housing including an opening and a first interchangeable seal removably received within the opening.

In a further non-limiting embodiment of the foregoing charge port assembly, a second interchangeable seal is removably receivable within the opening after removing the first interchangeable seal.

In a further non-limiting embodiment of either of the foregoing charge port assemblies, the second interchangeable seal has a different configuration from the first interchangeable seal.

In a further non-limiting embodiment of any of the foregoing charge port assemblies, the housing is made of a first material and the first interchangeable seal is made of a second, different material.

In a further non-limiting embodiment of any of the foregoing charge port assemblies, the first material includes a hard shot thermoplastic material and the second material includes a soft shot thermoplastic material.

In a further non-limiting embodiment of any of the foregoing charge port assemblies, the housing includes a hinge arm.

In a further non-limiting embodiment of any of the foregoing charge port assemblies, the first interchangeable seal is received within the opening by an interference fit.

In a further non-limiting embodiment of any of the foregoing charge port assemblies, the first interchangeable seal includes an opening.

In a further non-limiting embodiment of any of the foregoing charge port assemblies, a port of the charge port assembly is accessible through the opening of the interchangeable seal.

In a further non-limiting embodiment of any of the foregoing charge port assemblies, the interchangeable seal includes a flange that abuts a surface of the housing surrounding the opening of the housing.

A molding method according to another exemplary aspect of the present disclosure includes, among other things, injecting a first shot of material into a mold cavity to form a housing of a charge port assembly, positioning an insert within the mold cavity, and injecting a second shot of material into the mold cavity to form an interchangeable seal within the housing.

In a further non-limiting embodiment of the foregoing molding method, the first shot of material is a molten hard shot of plastic material.

In a further non-limiting embodiment of either of the foregoing molding methods, the second shot of material is a molten soft shot of plastic material.

In a further non-limiting embodiment of any of the foregoing molding methods, the method includes removing the charge port assembly from the mold cavity after injecting the second shot of material.

In a further non-limiting embodiment of any of the foregoing molding methods, the method includes injecting a third shot of material into the mold cavity to form a second housing of a second charge port assembly, positioning a second insert within the mold cavity, the second insert having a different design than the insert, and injecting a fourth shot of material into the mold cavity to form a second interchangeable seal within the second housing.

In a further non-limiting embodiment of any of the foregoing molding methods, the charge port assembly is configured to interface with a first style of an inlet charge coupler and the second charge port assembly is configured to interface with a second style of inlet charge coupler.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a charge port assembly and molding method for constructing the charge port assembly. An exemplary charge port assembly includes a housing including an opening and a first interchangeable seal removably received within the opening. The first interchangeable seal may be removed and replaced by a second interchangeable seal having a different design configuration from the first interchangeable seal. The housing of the charge port assembly can therefore accommodate seals of various sizes and shapes for sealing relative to different inlet charge coupler designs. The charge port assembly can be made in a two-shot molding method. These and other features are discussed in greater detail in the following paragraphs of this detailed description.

Figure 1:
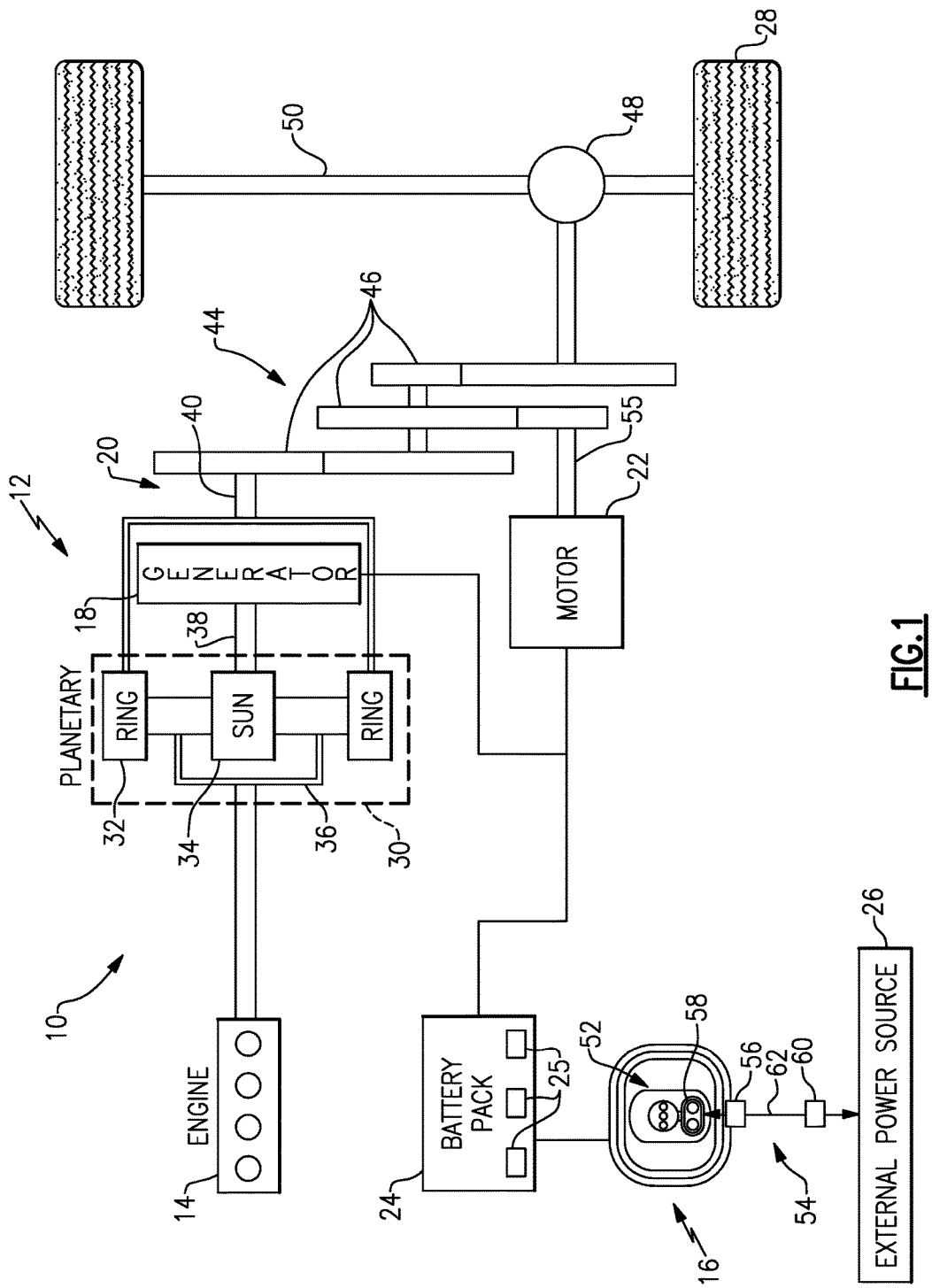
FIG. 1 schematically illustrates a powertrain of an electrified vehicle.

FIG. 1 schematically illustrates a powertrain 10 for an electrified vehicle 12. In a non-limiting embodiment, the electrified vehicle 12 is a plug-in hybrid electric vehicle (PHEV). However, other electrified vehicles could also benefit from the teachings of this disclosure, including but not limited to, battery electric vehicles (BEV's).

In a non-limiting embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 also includes a charging system 16 for charging the energy storage devices (e.g., battery cells) of the battery pack 24. The charging system 16 is connectable to an external power source 26 (e.g., utility/grid power from an electrical grid) for receiving and distributing power throughout the electrified vehicle 12. In a non-limiting embodiment, the charging system 16 includes a charge port assembly 52 located on-board the electrified vehicle 12 and electric vehicle supply equipment (EVSE) 54 that is operably connectable between the charge port assembly 52 and the external power source 26. The charge port assembly 52 is adapted to selectively receive power from the external power source 26, through the EVSE 54, and then supply the power to the battery pack 24 for charging the battery cells. In a further non-limiting embodiment, the EVSE 54 includes an inlet charge coupler 56 that plugs into a port 58 provided by the charge port assembly 52, a plug 60 that plugs into the external power source 26, and a wire 62 that connects between the inlet charge coupler 56 and the plug 60.

The powertrain 10 shown in FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle.

Figure 2:
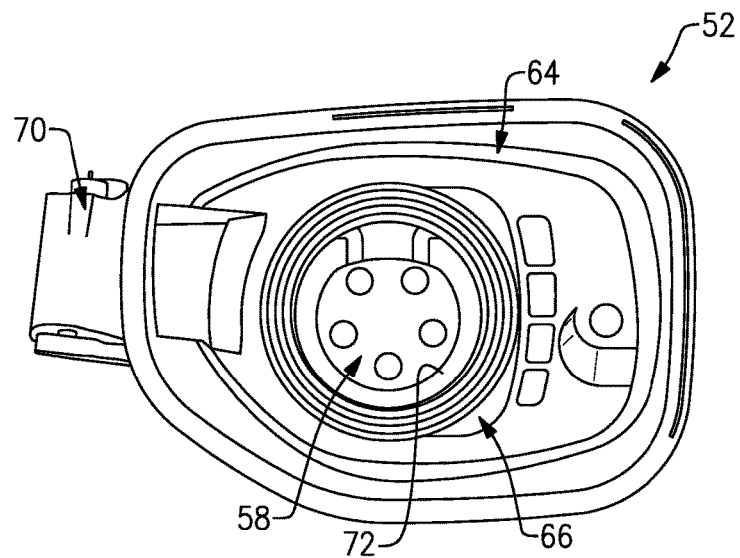
FIG. 2 illustrates a charge port assembly for an electrified vehicle.
Figure 3:
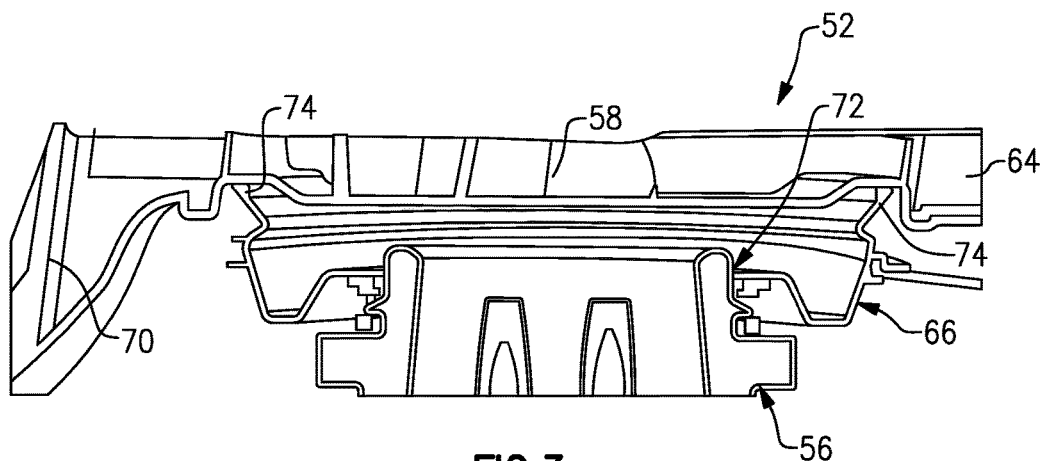
FIG. 3 illustrates an inlet charge coupler connected to the charge port assembly of FIG. 2 in order to charge an electrified vehicle battery pack.

FIGS. 2-3, with continued reference to FIG. 1, illustrate an exemplary charge port assembly 52 for use with the electrified vehicle 12. For example, the charge port assembly 52 may be part of the charging system 16 of the electrified vehicle 12.

In a non-limiting embodiment, the charge port assembly 52 includes a housing 64 and an interchangeable seal 66. The housing 64 includes an opening 68 (best shown in FIG. 4) for receiving a port 58 and the interchangeable seal 66. In a non-limiting embodiment, the opening 68 is a circular opening that extends completely through the housing 64. However, other shapes are also contemplated. The housing 64 may additionally include a hinge arm 70 for connecting a door (not show) to conceal the port 58. The size and shape of the housing 64 is not intended to limit this disclosure.

In a non-limiting embodiment, the housing 64 is made of a relatively hard thermoplastic material. Suitable materials include, but are not limited to, thermoplastics that include a glass fiber reinforcement. In a non-limiting embodiment, the housing 64 is made of polypropylene with 30% glass fiber reinforcement.

The interchangeable seal 66 acts as a dust cover to avoid ingress of dust, water, and other environmental contaminants into the port 58. The interchangeable seal 66 includes an opening 72 that at least partially exposes the port 58 to an inlet charge coupler 56 (shown in FIG. 3). The interchangeable seal 66 is removably received within the opening 68 of the housing 64. In a non-limiting embodiment, the interchangeable seal 66 is received within the opening 68 of the housing 64 by an interference fit. In another non-limiting embodiment, the interchangeable seal 66 includes a flange 74 (see FIG. 3). The flange 74 abuts a surface of the housing 64 that surrounds the opening 68 to help retain the interchangeable seal 66 relative to the housing 64.

In a non-limiting embodiment, the interchangeable seal 66 is made of a relatively soft thermoplastic material. Suitable materials include, but are not limited to, rubber, thermoplastic elastomer polyolefin, EPDM rubber, etc.

Referring now primarily to FIG. 3, the inlet charge coupler 56 may be plugged into the port 58 for charging the electrified vehicle 12. The inlet charge coupler 56 is inserted through the opening 72 of the interchangeable seal 66 to plug the inlet charge coupler 56 into the port 58. The interchangeable seal 66 includes a specific size and shape designed to accommodate the specific size and shape of the inlet charge coupler 56. The inlet charge coupler 56, for example, may be any type of charge coupler including Type 1 couplers (e.g., SAE J1772) or Type 2 couplers (e.g., IEC 62196 or GB/T 20234), and the interchangeable seal 66 is sized to specifically accommodate one of these charge coupler types.

Figure 5:
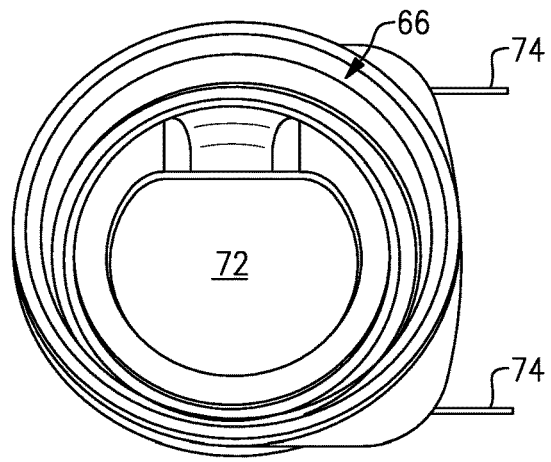
FIGS. 5 and 5A illustrates interchangeable seals or a charge port assembly.
Figure 5A:
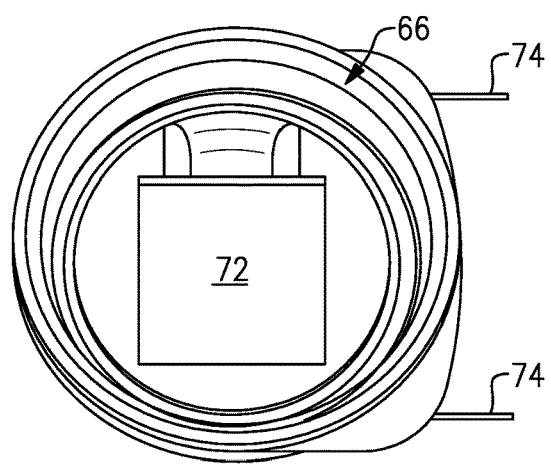

In a non-limiting embodiment, the interchangeable seal 66 may be removed from the housing 64 and replaced with a second interchangeable seal (see, e.g., seal 66 of FIG. 5A). The second interchangeable seal has a different size, shape, and overall design than the interchangeable seal 66. In this way, a single housing design can be used to provide a charge port assembly capable of interfacing with any style of inlet charge coupler 56.

Figure 4:
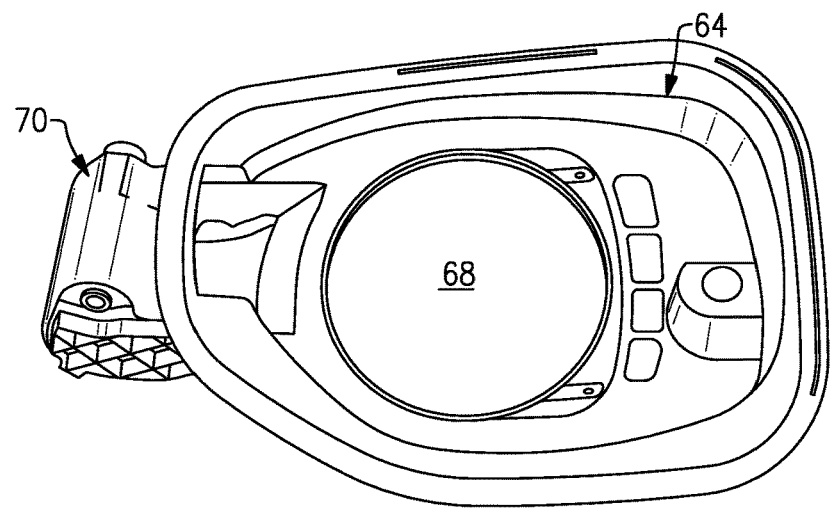
FIG. 4 illustrates a housing of a charge port assembly.

The housing 64 of the charge port assembly 52 is shown in FIG. 4 without the port 58 and the interchangeable seal 66. The interchangeable seal 66 is shown in FIG. 5 removed from the housing 64.

The charge port assembly 52 may be injection molded utilizing a two-shot injection molding process. A first shot of material (i.e., the hard shot) provides the housing 64. A second shot of material (i.e., the soft shot) provides the interchangeable seal 66. The two-shot process facilitates incorporating the interchangeable seal 66 within the housing 64 during the molding process.

Figure 6:
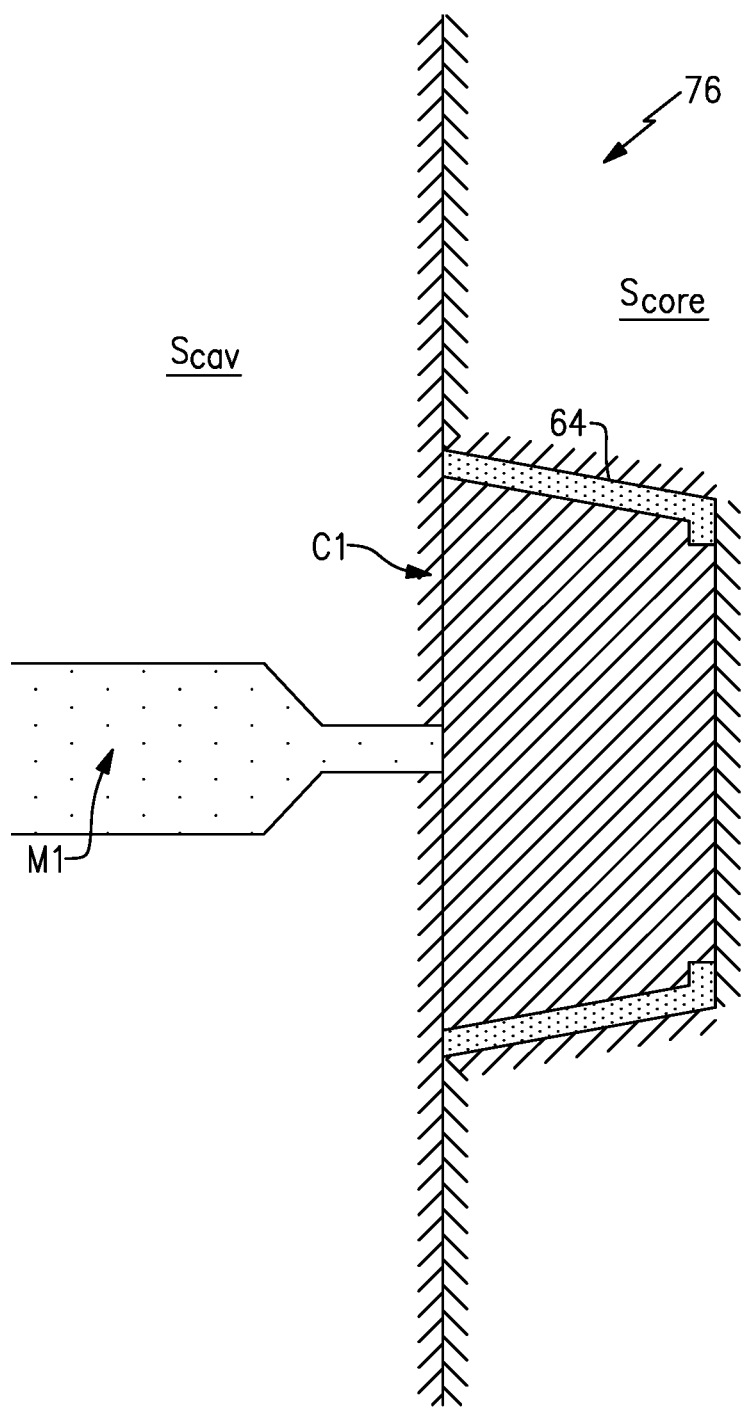
FIG. 6 illustrates a mold assembly providing a cavity to form the housing of FIG. 4.
Figure 7:
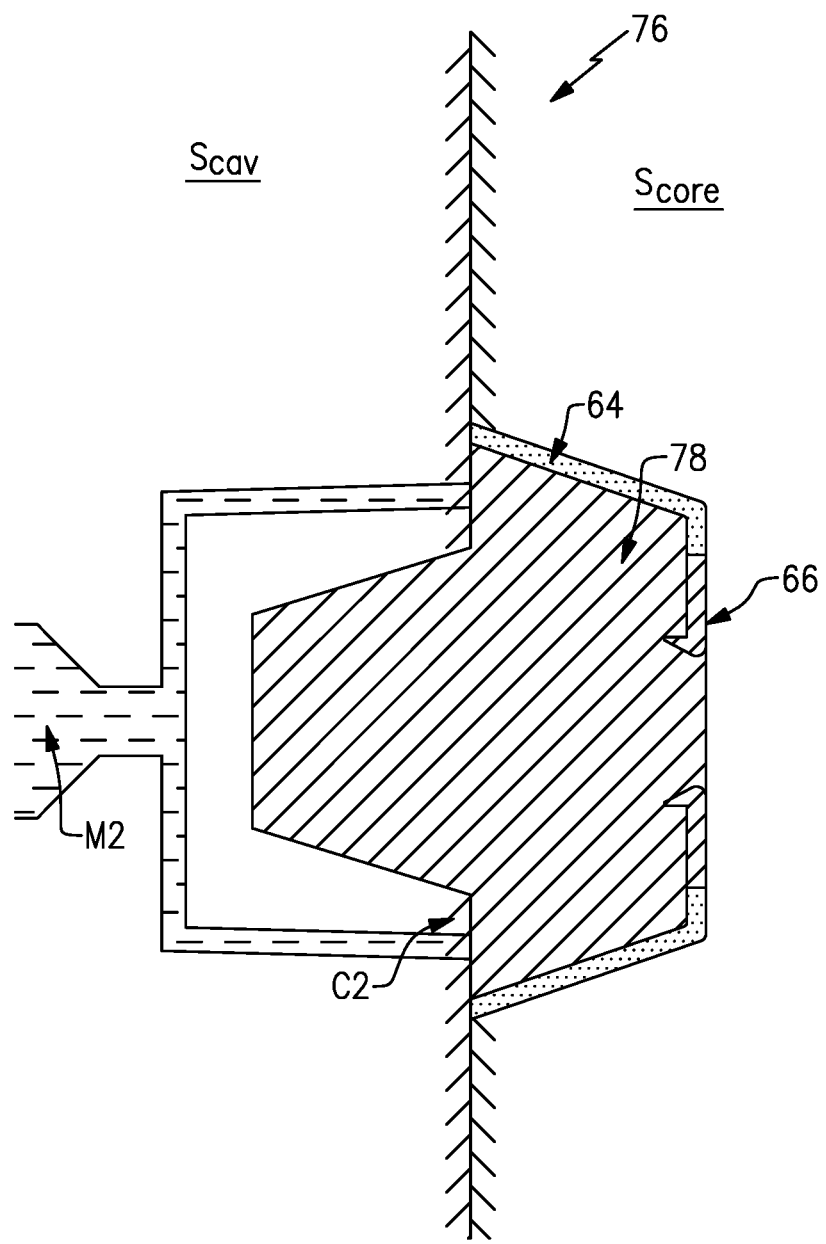
FIG. 7 illustrates a mold assembly providing a cavity to form the interchangeable seal of FIG. 5.

FIGS. 6-7, with continued reference to FIGS. 2-5, schematically illustrate an exemplary mold assembly 76 for forming the charge port assembly 52. In a non-limiting embodiment, the mold assembly 76 is employed in a two-shot molding process to form the charge port assembly 52. Referring first to FIG. 6, during the injection molding process, a liquid material $M_1$ (e.g., a molten hard shot of plastic material) is moved into a cavity $C_1$ provided between a core side $S_{core}$ and a cavity side $S_{cav}$ of the mold assembly 76. The material $M_1$ hardens within the cavity $C_1$ to form the housing 64 (molded housing shown alone in FIG. 4). After the material $M_1$ has hardened, the core side $S_{core}$ is separated from the housing 64 and the injection molding tooling is manipulated into a position appropriate for the second shot to form the interchangeable seal 66.

Referring now to FIG. 7, with the core side $S_{core}$ separated from the housing 64, an insert 78 may be positioned within a cavity C2 of the mold assembly 76. The insert 78 includes a size and a shape corresponding to a desired size and shape of the interchangeable seal 66. With the housing 64 remaining in the mold assembly 76 and the insert 78 already positioned, the injection molding process next includes injecting a second shot of material $M_2$ (e.g., a molten soft shot of plastic material) into the cavity $C_2$ to form the interchangeable seal 66. The second shot moves the material $M_2$ directly against the housing 64 and thus forms the interchangeable seal 66 within the opening 68 of the housing 64 (molded assembly shown in FIGS. 2 and 3). The molded charge port assembly 52 can then be removed from the mold assembly 76.

The molding process depicted in FIGS. 6 and 7 could be repeated to form additional charge port assemblies. However, if desired, an insert having a different design than the insert 78 shown in FIG. 7 could be inserted into the cavity C2 prior to the second shot of the molding process. In this manner, a charge port assembly suitable for interfacing with a different style inlet charge coupler could be manufactured using the same set of tooling used to manufacture charge port assemblies suitable for another type of inlet charge coupler. The proposed molding process of this disclosure thus eliminates the need to provide unique tooling sets for manufacturing charge port assemblies for electrified vehicles sold and operated in different global regions (e.g., North America, Europe, Asia, etc.).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charge port assembly for an electrified vehicle, comprising:
   a housing mounted on said electrified vehicle and including an opening that extends completely through said housing;
   a port disposed within said opening, wherein said port is configured to electrically connect an inlet charge coupler for charging said electrified vehicle; and
   a first interchangeable seal removably received within said opening and configured to block ingress of contaminants into said port;
   a second interchangeable seal removably receivable within said opening after removing said first interchangeable seal;
   wherein said second interchangeable seal has a different configuration from said first interchangeable seal.

2. The charge port assembly as recited in claim 1, wherein said housing is made of a first material and said first interchangeable seal is made of a second, different material.

3. The charge port assembly as recited in claim 2, wherein said first material includes a hard shot thermoplastic material and said second material includes a soft shot thermoplastic material.

4. The charge port assembly as recited in claim 1, wherein said housing includes a hinge arm.

5. The charge port assembly as recited in claim 1, wherein said first interchangeable seal is received within said opening by an interference fit.

6. The charge port assembly as recited in claim 1, wherein said first interchangeable seal include an opening.

7. The charge port assembly as recited in claim 6, wherein the port of the charge port assembly is accessible through said opening of said first interchangeable seal.

8. The charge port assembly as recited in claim 1, wherein said first interchangeable seal includes a flange that abuts a surface of said housing surrounding said opening of said housing.

* * * * *